(12) United States Patent
Fujimori et al.

(10) Patent No.: US 11,498,266 B2
(45) Date of Patent: Nov. 15, 2022

(54) THREE-DIMENSIONAL MOLDING DEVICE AND METHOD FOR MOLDING THREE-DIMENSIONAL MOLDED OBJECT

(71) Applicant: SEIKO EPSON CORPORATION, Tokyo (JP)

(72) Inventors: Koji Fujimori, Matsumoto (JP); Manabu Watanabe, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 170 days.

(21) Appl. No.: 16/800,730

(22) Filed: Feb. 25, 2020

(65) Prior Publication Data

US 2020/0269491 A1 Aug. 27, 2020

(30) Foreign Application Priority Data

Feb. 26, 2019 (JP) .............................. JP2019-032678

(51) Int. Cl.
*B29C 64/393* (2017.01)
*B29C 64/232* (2017.01)
(Continued)

(52) U.S. Cl.
CPC .......... *B29C 64/124* (2017.08); *B29C 64/209* (2017.08); *B29C 64/232* (2017.08);
(Continued)

(58) Field of Classification Search
CPC ... B29C 64/295; B29C 64/386; B29C 64/393; B33Y 50/00; B33Y 50/02
See application file for complete search history.

(56) References Cited

U.S. PATENT DOCUMENTS 9,579,851 B2 * 2/2017 Mark .................... B29C 64/209
10,328,637 B2 * 6/2019 Nystrom ................ B29C 64/40
(Continued)

FOREIGN PATENT DOCUMENTS

| CN | 108790155 A | 11/2018 |
| JP | 2017-523063 A | 8/2017 |
| JP | 2017-206011 A | 11/2017 |

*Primary Examiner* — Atul P. Khare
(74) *Attorney, Agent, or Firm* — Chip Law Group

(57) ABSTRACT

A three-dimensional molding device includes a discharge unit that discharges a molding material towards a stage, a heating unit that heats the discharge unit, a temperature acquisition unit that acquires a temperature of the molding material placed on the stage, and a control unit. The control unit controls the heating unit such that a relationship of a temperature Tb of an existing layer, a path cross-sectional area Sb of the existing layer, a specific gravity ρb of a first thermoplastic resin contained in the existing layer, a specific heat Cb of the first thermoplastic resin, a temperature Tu of the heating unit, a path cross-sectional area Su of a subsequent layer, a specific gravity ρu of a second thermoplastic resin contained in the subsequent layer, a specific heat Cu of the second thermoplastic resin, a thermal decomposition temperature Td that is a lower temperature between a thermal decomposition temperature of the first thermoplastic resin and a thermal decomposition temperature of the second thermoplastic resin, and a glass transition point Tg that is a higher glass transition point between a glass transition point of the first thermoplastic resin and a glass transition point of the second thermoplastic resin satisfies the following expression (1).

$$Td > (Tu \times Su \times \rho u \times Cu + Tb \times Sb \times \rho b \times Cb)/(Su \times \rho u \times Cu + Sb \times \rho b \times Cb) > Tg \quad (1)$$

10 Claims, 6 Drawing Sheets

(51) Int. Cl.
  *B29C 64/124* (2017.01)
  *B29C 64/209* (2017.01)
  *B29C 64/295* (2017.01)
  *B33Y 50/02* (2015.01)
  *B33Y 30/00* (2015.01)
  *B33Y 10/00* (2015.01)

(52) U.S. Cl.
  CPC .......... *B29C 64/295* (2017.08); *B29C 64/393* (2017.08); *B29K 2995/0041* (2013.01); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 10,562,227 | B2 * | 2/2020 | Go | B29C 48/266 |
| 10,843,403 | B2 * | 11/2020 | Reese | B23K 26/34 |
| 11,072,027 | B2 * | 7/2021 | Juan | B22F 10/20 |
| 11,192,298 | B2 * | 12/2021 | Nixon | B33Y 10/00 |
| 2017/0157845 | A1 * | 6/2017 | Bihari | B33Y 10/00 |
| 2017/0334137 | A1 | 11/2017 | Nystrom et al. | |
| 2018/0311894 | A1 | 11/2018 | Saito et al. | |
| 2021/0162663 | A1 | 6/2021 | Saito et al. | |

* cited by examiner

THREE-DIMENSIONAL MOLDING DEVICE AND METHOD FOR MOLDING THREE-DIMENSIONAL MOLDED OBJECT

The present application is based on, and claims priority from JP Application Serial Number 2019-032678, filed Feb. 26, 2019, the disclosure of which is hereby incorporated by reference herein in its entirety.

BACKGROUND

1. Technical Field

The present disclosure relates to a three-dimensional molding device and a method for molding a three-dimensional molded object.

2. Related Art

For example, JP-T-2017-523063 discloses a technique of forming a three-dimensional object having high adhesion between stack layers by extruding a heated thermoplastic material from an extrusion head to form a stack layer, applying energy to a surface of the stack layer using an energy source such as an ultraviolet light source, an infrared light source, and a laser, and stacking a subsequent stack layer on the stack layer that is applied with energy.

Since energy is applied to the surface of the stack layer in the above-described technique, a large amount of energy is consumed wastefully when the adhesion between the stack layers is high.

SUMMARY

According to one aspect of the present disclosure, a three-dimensional molding device is provided. The three-dimensional molding device includes a plasticizing unit that plasticizes a material containing a thermoplastic resin into a molding material, a discharge unit that discharges the molding material supplied from the plasticizing unit towards a stage, a moving mechanism that changes a relative position between the discharge unit and the stage, a heating unit that heats the discharge unit, a temperature acquisition unit that acquires a temperature of the molding material placed on the stage, and a control unit that controls the plasticizing unit and the moving mechanism to arrange the molding material in a layer along a predetermined path. The control unit controls the heating unit such that a temperature Tb of an existing layer that is a layer of the molding material placed on the stage, a path cross-sectional area Sb of the existing layer, a specific gravity ρb of a first thermoplastic resin contained in a material used for molding the existing layer, a specific heat Cb of the first thermoplastic resin, a temperature Tu of the heating unit, a path cross-sectional area Su of a subsequent layer that is a layer of the molding material placed on the existing layer, a specific gravity ρu of a second thermoplastic resin contained in a material used for molding the subsequent layer, a specific heat Cu of the second thermoplastic resin, a thermal decomposition temperature Td that is a lower thermal decomposition temperature between a thermal decomposition temperature of the first thermoplastic resin and a thermal decomposition temperature of the second thermoplastic resin, and a glass transition point Tg that is a higher glass transition point between a glass transition point of the first thermoplastic resin and a glass transition point of the second thermoplastic resin satisfy a relationship of the following expression (1).

$$Td > (Tu \times Su \times \rho u \times Cu + Tb \times Sb \times \rho b \times Cb)/(Su \times \rho u \times Cu + Sb \times \rho b \times Cb) > Tg \quad (1)$$

DESCRIPTION OF EXEMPLARY EMBODIMENTS

A. First Embodiment

Figure 1:
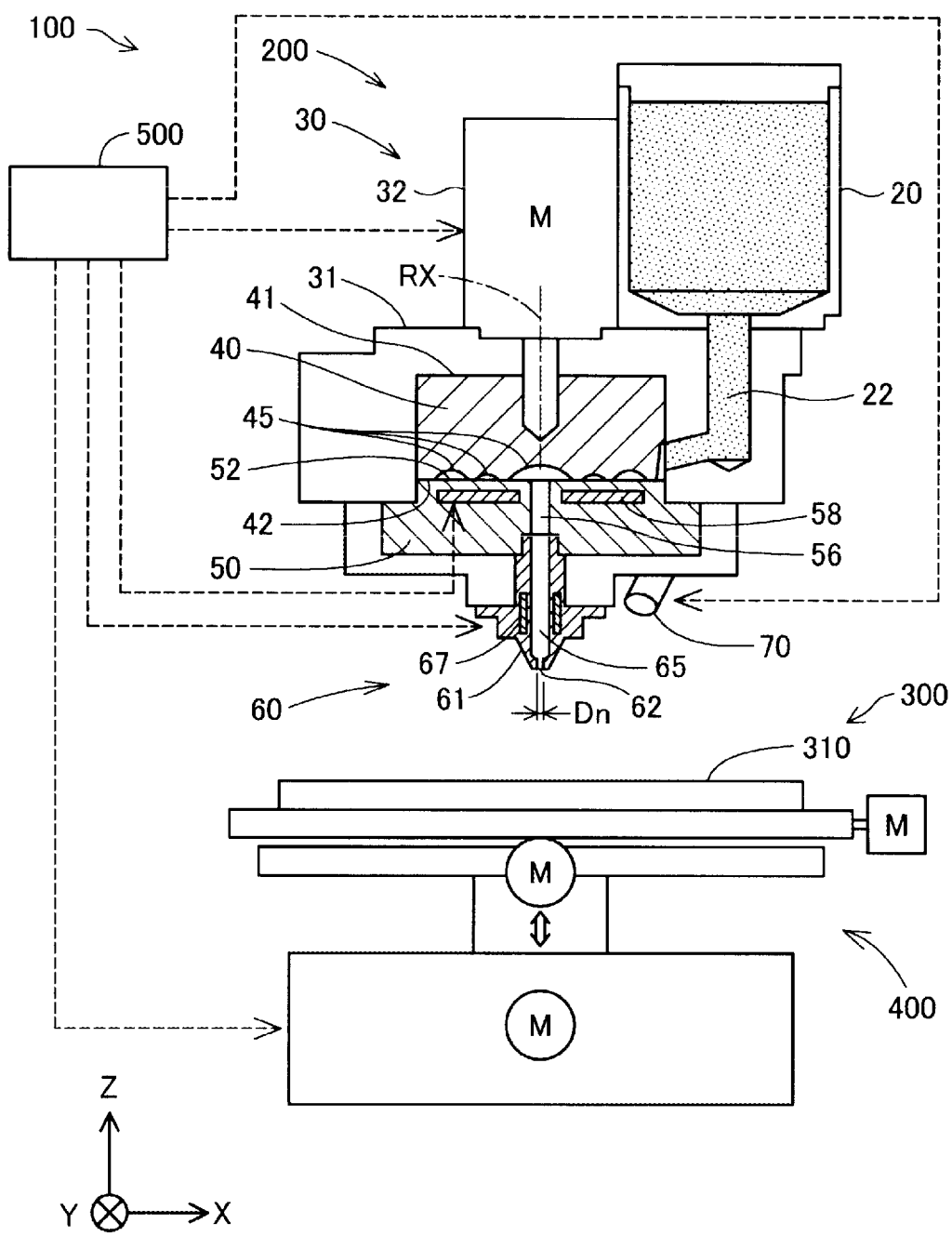
FIG. 1 is a diagram showing a schematic configuration of a three-dimensional molding device according to a first embodiment.

FIG. 1 is a diagram showing a schematic configuration of a three-dimensional molding device 100 according to a first embodiment. FIG. 1 shows arrows along X, Y, and Z directions that are orthogonal to each other. The X direction and the Y direction are along a horizontal direction and the Z direction is along a vertical direction. In other drawings, the arrows along the X, Y, and Z directions are shown as appropriate. The X, Y, and Z directions in FIG. 1 represent the same directions as the X, Y, and Z directions in other drawings.

The three-dimensional molding device 100 according to the present embodiment includes a molding unit 200, a stage 300, a moving mechanism 400, and a control unit 500. Under control of the control unit 500, the three-dimensional molding device 100 molds a three-dimensional molded object having a desired shape on the stage 300 by discharging a molding material from a nozzle 61 provided in the molding unit 200 towards a molding surface 310 of the stage 300 and driving the moving mechanism 400 to change a relative position between the nozzle 61 and the stage 300.

The moving mechanism 400 changes a relative position between the molding unit 200 and the stage 300. The moving mechanism 400 moves the stage 300 with respect to the molding unit 200 in the present embodiment. The moving mechanism 400 according to the present embodiment includes a three-axis positioner that moves the stage 300 in three axial directions of the X, Y, and Z directions by driving forces from three motors. Each motor is driven under the control of the control unit 500. The moving mechanism 400 may be configured not to move the stage 300 and may be configured to move the molding unit 200 instead of the stage 300. Alternatively, the moving mechanism 400 may be configured to move both the stage 300 and the molding unit 200.

The control unit 500 is implemented by a computer including one or more processors, a main storage device, and an input and output interface that inputs a signal from the outside and outputs a signal to the outside. The processor executes a program or an instruction read from the main storage device to cause the control unit 500 to control operations of the molding unit 200 and the moving mechanism 400 so as to perform molding processing to mold the three-dimensional molded object in the present embodiment. The operations include a movement of a three-dimensional relative position of the molding unit 200 with respect to the stage 300. The control unit 500 may be implemented by a combination of a plurality of circuits instead of the computer.

The molding unit 200 includes a material supply unit 20, a plasticizing unit 30, a discharge unit 60, and a temperature acquisition unit 70. The material supply unit 20 contains a material in a pellet form, a powder form, or the like. An example of the material in the present embodiment includes an ABS resin that is an amorphous thermoplastic resin formed in a pellet form. The material supply unit 20 according to the present embodiment is implemented by a hopper. A supply path 22 that couples the material supply unit 20 with the plasticizing unit 30 is provided below the material supply unit 20. The material supply unit 20 supplies the material to the plasticizing unit 30 via the supply path 22.

The plasticizing unit 30 includes a screw case 31, a driving motor 32, a flat screw 40, and a barrel 50. The plasticizing unit 30 melts at least a part of a material that is in a solid form and is supplied from the material supply unit 20 and supplies a molding material in a paste shape to the discharge unit 60. The flat screw 40 may be simply referred to as a screw.

The screw case 31 contains the flat screw 40. The driving motor 32 is fixed to an upper surface of the screw case 31. The control unit 500 controls rotation of the driving motor 32. A rotation shaft of the driving motor 32 is coupled to an upper surface 41 of the flat screw 40.

The flat screw 40 has a substantially cylindrical shape of which height in a direction along a central axis RX is smaller than diameter. The flat screw 40 is disposed in the screw case 31 such that the central axis RX is parallel to the Z direction. The flat screw 40 rotates around the central axis RX in the screw case 31 by torque generated by the driving motor 32.

The flat screw 40 includes a groove forming surface 42 on a side opposite to the upper surface 41 in a direction along the central axis RX. A material flow path 45 is formed on the groove forming surface 42. A detailed configuration of the groove forming surface 42 of the flat screw 40 will be described later with reference to FIG. 2.

The barrel 50 is provided below the flat screw 40. The barrel 50 includes a screw facing surface 52 that faces the groove forming surface 42 of the flat screw 40. A heater 58 is provided in the barrel 50 at a position facing the material flow path 45 of the flat screw 40. The control unit 500 controls a temperature of the heater 58.

The screw facing surface 52 is provided with a communication hole 56 that communicates with the discharge unit 60 at a position on the central axis RX of the flat screw 40. A detailed configuration of the screw facing surface 52 of the barrel 50 will be described later with reference to FIG. 3.

The discharge unit 60 includes the nozzle 61 and a nozzle heater 67. The nozzle 61 is provided with a nozzle flow path 65 and a nozzle hole 62. The nozzle hole 62 is provided at a tip portion of the nozzle 61 and is an opening used for discharging the molding material. The communication hole 56 of the plasticizing unit 30 communicates with the nozzle hole 62 through the nozzle flow path 65. The nozzle 61 is provided with the nozzle hole 62 having a circular shape in the present embodiment. A diameter of the nozzle hole 62 is referred to as a nozzle diameter Dn. The nozzle 61 may be provided with the nozzle hole 62 having a quadrilateral shape or the like instead of a circular shape.

The nozzle heater 67 is provided on an outer periphery of the nozzle flow path 65 in the nozzle 61. The nozzle heater 67 heats the molding material in the nozzle flow path 65. A temperature of the nozzle heater 67 may be measured by, for example, a thermocouple thermometer. The measured temperature of the nozzle heater 67 is transmitted to the control unit 500. The nozzle heater 67 may be referred to as a heating unit.

The temperature acquisition unit 70 is disposed adjacent to the nozzle 61. The temperature acquisition unit 70 according to the present embodiment is implemented by a radiation thermometer which is anon-contact thermometer. The temperature acquisition unit 70 acquires a temperature of a molding material stacked on the stage 300. Information relating to the temperature acquired by the temperature acquisition unit 70 is transmitted to the control unit 500. The temperature acquisition unit 70 may be implemented by an infrared camera which is a non-contact thermometer.

Figure 2:
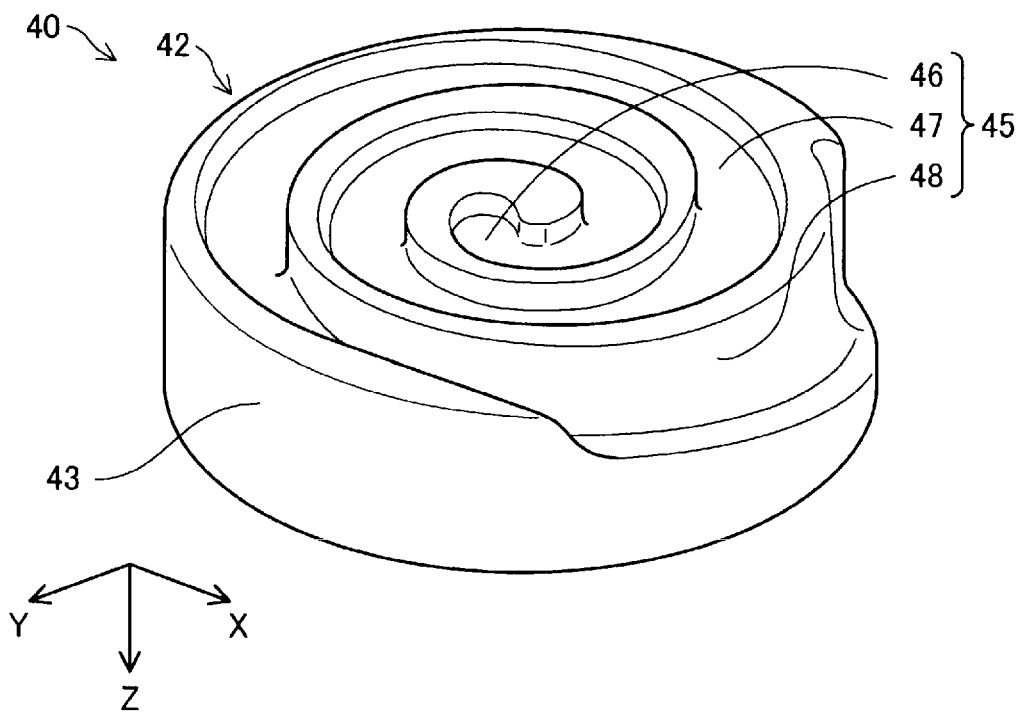
FIG. 2 is a perspective view showing a configuration of a groove forming surface of a flat screw.

FIG. 2 is a perspective view showing a configuration of the groove forming surface 42 of the flat screw 40 according to the present embodiment. For easy understanding of the technique, the flat screw 40 in FIG. 2 is shown in a state in which an upper-lower positional relationship shown in FIG. 1 is reversed. As described above, the material flow path 45 is formed on the groove forming surface 42 of the flat screw 40. The material flow path 45 includes a central portion 46, a vortex portion 47, and a material introduction portion 48.

The central portion 46 is a circular cavity formed around the central axis RX of the flat screw 40. The central portion 46 faces the communication hole 56 that is provided in the barrel 50.

The vortex portion 47 is a groove that extends in a vortex shape formed by drawing arcs around the central portion 46 and towards an outer periphery of the groove forming surface 42. The vortex portion 47 may be configured to extend in an involute curve shape or a spiral shape. One end of the vortex portion 47 is coupled to the central portion 46, and the other end of the vortex portion 47 is coupled to the material introduction portion 48.

The material introduction portion 48 is a groove that has a width larger than the vortex portion 47 provided at an outer peripheral edge of the groove forming surface 42. The material introduction portion 48 is continuous to a side surface 43 of the flat screw 40. The material introduction unit 48 introduces a material supplied from the material supply unit 20 into the vortex unit 47 via the supply path 22. One vortex portion 47 and one material introduction portion 48 are provided from the central portion 46 towards the outer periphery of the flat screw 40 in FIG. 2. Alternatively, a plurality of vortex portions 47 and a plurality of material introduction portions 48 may be provided from the central portion 46 towards the outer periphery of the flat screw 40.

Figure 3:
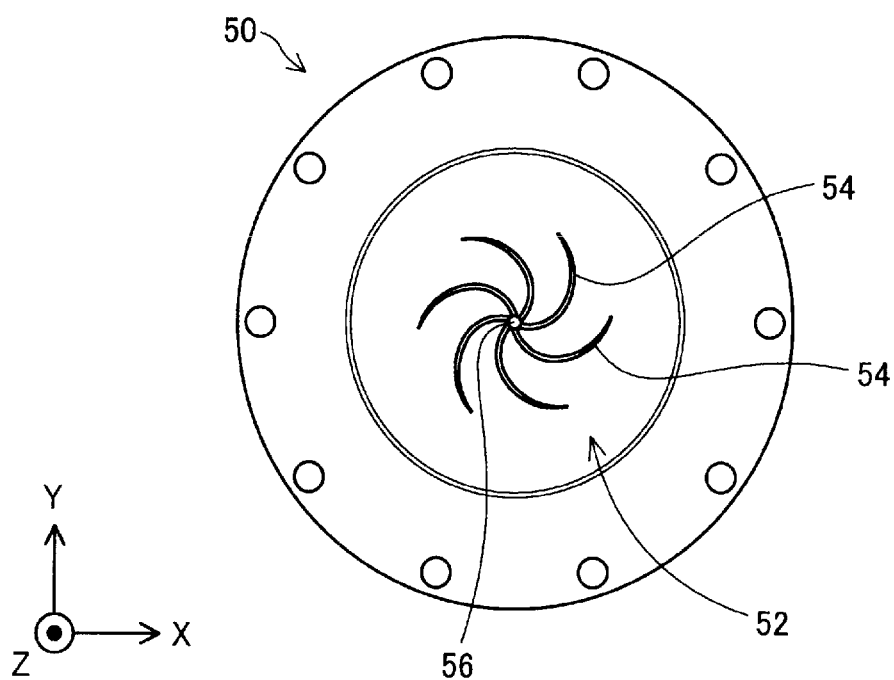
FIG. 3 is a top view showing a configuration of a screw facing surface of a barrel.

FIG. 3 is a top view showing a configuration of the screw facing surface 52 of the barrel 50 according to the present embodiment. As described above, the communication hole 56 that communicates with the discharge unit 60 is formed at the center of the screw facing surface 52. A plurality of guide grooves 54 are formed around the communication hole 56 on the screw facing surface 52. Each guide groove 54 extends in a vortex shape from the communication hole 56 towards an outer periphery of the screw facing surface 52 with one end thereof coupled to the communication hole 56. Each guide groove 54 has a function of guiding a molding material into the communication hole 56.

Figure 4:
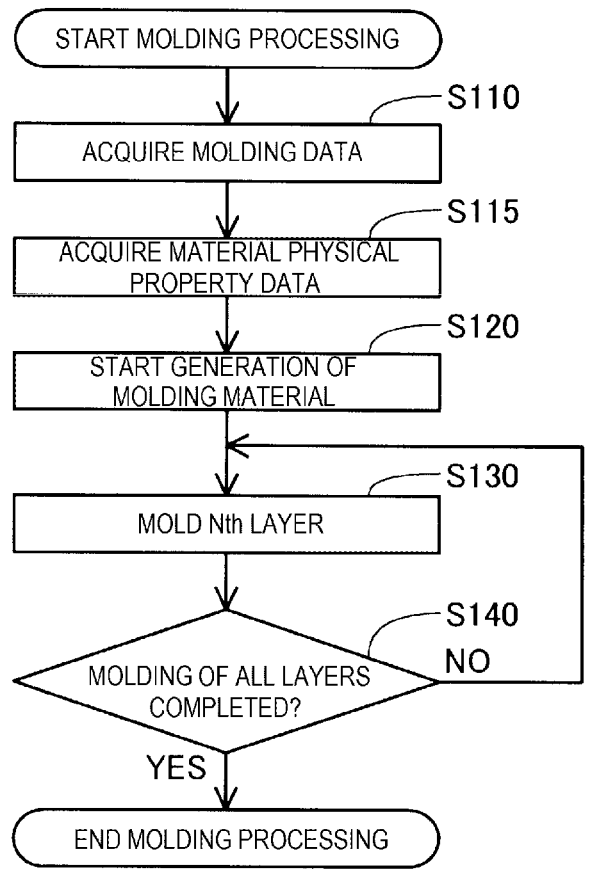
FIG. 4 is a flowchart showing molding processing.

FIG. 4 is a flowchart showing molding processing according to the present embodiment. The processing is performed by the control unit 500 of the three-dimensional molding device 100 when a user performs a predetermined start operation on an operation panel provided in the three-dimensional molding device 100 or a computer coupled to the three-dimensional molding device 100.

First, the control unit 500 acquires molding data in step S110. The molding data represents information relating to a molding path that is a moving path of the nozzle 61 that discharges a molding material while moving with respect to the stage 300, a discharging amount that is a flow rate of the molding material discharged from the nozzle 61, a rotation speed of the driving motor 32 that rotates the flat screw 40, a target temperature of the heater 58 in the barrel 50, and the like. The molding data is generated by, for example, slicer software installed in a computer coupled to the three-dimensional molding device 100. The slicer software reads shape data representing a shape of a three-dimensional molded object OB generated using three-dimensional CAD software or three-dimensional CG software and divides the shape of the three-dimensional molded object OB into layers having a predetermined thickness so as to generate the molding data. The shape data read by the slicer software is data in an STL format, an AMF format, or the like. The molding data generated by the slicer software is represented by a G code, an M code, or the like. The control unit 500 acquires the molding data from the computer coupled to the three-dimensional molding device 100 or a recording medium such as a USB memory.

Next, the control unit 500 acquires material physical property data in step S115. The material physical property data is data representing physical properties of a thermoplastic resin contained in a material used for molding the three-dimensional molded object OB. The material physical property data represents information relating to whether the thermoplastic resin is a crystallographic thermoplastic resin or an amorphous thermoplastic resin, and physical properties of the thermoplastic resin such as a thermal decomposition temperature, a melting point, a glass transition point, a specific gravity, and a specific heat. In the present embodiment, the material physical property data relates to an ABS resin that is a material used for molding the three-dimensional molded object OB, the thermoplastic resin is set to an amorphous thermoplastic resin, the thermal decomposition temperature is set to 260 DEG C., the glass transition point is set to 110 DEG C., the specific gravity is set to 1.11, and the specific heat is set to 1.40 (kJ/kg·K). Since the ABS resin is an amorphous thermoplastic resin having no melting point, the melting point of the material physical property data is not set. The control unit 500 acquires the material physical property data from the computer coupled to the three-dimensional molding device 100 or a recording medium such as a USB memory.

Thereafter, the control unit 500 controls rotation of the flat screw 40 and a temperature of the heater 58 provided in the barrel 50 according to the molding data so as to start generation of the molding material in step S120. The material supplied from the material supply unit 20 via the supply path 22 is conveyed from the material introduction portion 48 to the vortex portion 47 of the flat screw 40 by the rotation of the flat screw 40. At least a part of the material conveyed to the vortex portion 47 is melted by the rotation of the flat screw 40 and heating of the heater 58 to generate a paste-like molding material having fluidity. The generated molding material is conveyed from the vortex portion 47 to the central portion 46 by the rotation of the flat screw 40 and is supplied to the nozzle 61 of the discharge unit 60 via the communication hole 56. The molding material is continuously generated until the molding processing is completed.

Figure 5:
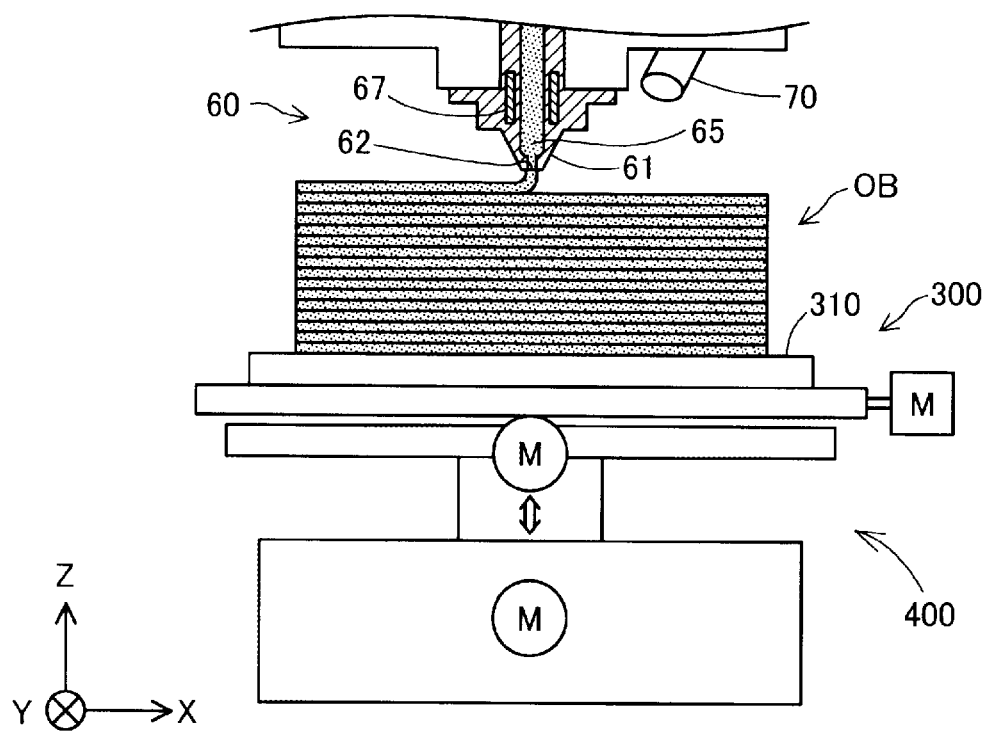
FIG. 5 is a diagram schematically showing a state in which a three-dimensional molded object is molded.

FIG. 5 is diagram schematically showing a state in which the three-dimensional molded object OB is molded. According to the molding data, the control unit 500 controls the moving mechanism 400 to change a relative position between the nozzle 61 and the stage 300, and the molding material is discharged from the nozzle 61 to mold a first layer of the three-dimensional molded object OB in step S130 with reference to FIGS. 4 and 5. The molded first layer of the three-dimensional molded object OB is cooled and hardened on the stage 300. Thereafter, the control unit 500 determines whether molding of all layers is completed in step S140. The control unit 500 may determine whether the molding of all layers is completed using the molding data. When the control unit 500 determines that the molding of all the layers is not completed in step S140, the processing returns to step S130 to mold a second layer of the three-dimensional molded object OB. The molded second layer of the three-dimensional molded object OB is cooled and hardened on the first layer. On the other hand, when the control unit 500 determines that the molding of all the layers is completed in step S140, the processing ends. The three-dimensional molded object OB obtained by stacking the layers of the molding material is molded by repeating processing in step S130 until the control unit 500 determines that the molding of all the layers is completed in step S140.

Figure 6:
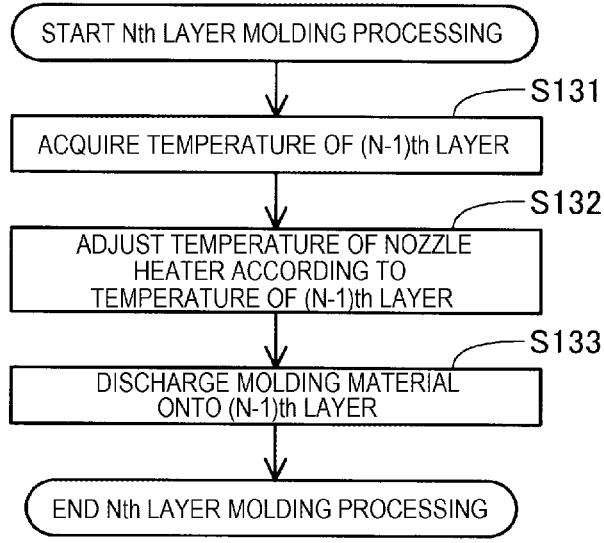
FIG. 6 is a flowchart showing Nth layer molding processing.
Figure 7:
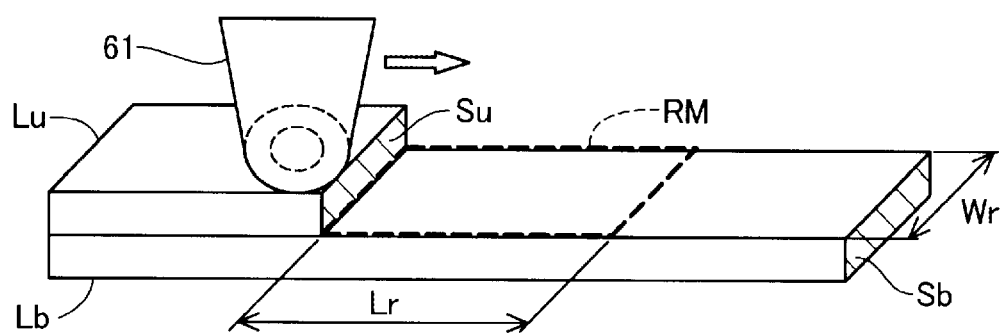
FIG. 7 is a diagram schematically showing a temperature measurement region.

FIG. 6 is a flowchart showing Nth layer molding processing of molding an Nth layer of the three-dimensional molded object OB. FIG. 7 is a diagram schematically showing a temperature measurement region RM. The processing is repeatedly performed by the control unit 500 when the Nth layer of the three-dimensional object OB is molded. N is a natural number greater than or equal to 2. That is, the processing is to mold the second or higher layers of the three-dimensional molded object OB. The temperature measurement region RM is represented by a broken line and a movement direction of the nozzle 61 is represented by an arrow in FIG. 7.

First, the control unit 500 uses the temperature acquisition unit 70 to acquire a temperature Tb of an (N−1)th layer of the three-dimensional molded object OB in step S131 with reference to FIGS. 6 and 7. For example, when the second layer of the three-dimensional molded object OB is molded, the control unit 500 acquires a temperature of the first layer of the three-dimensional molded object OB. When a third layer of the three-dimensional molded object OB is molded, the control unit 500 acquires a temperature of the second layer of the three-dimensional molded object OB. The (N−1)th layer of the three-dimensional molded object OB is referred to as an existing layer Lb and the Nth layer of the three-dimensional molded object OB is referred to as a subsequent layer Lu.

The temperature Tb of the (N−1)th layer of the three-dimensional molded object OB, that is, the temperature Tb of the existing layer Lb, is measured in the temperature measurement region RM. The temperature measurement region RM is provided on an upper surface of the existing layer Lb and is provided forward than a current position of the nozzle 61 in a movement direction of the nozzle 61. That is, a position of the temperature measurement region RM changes with the movement of the nozzle 61. A length Lr of the temperature measurement region RM along a movement path of the nozzle 61 is set to 10 mm from a tip portion of the nozzle 61 at the current position of the nozzle 61 as shown in FIG. 7. A width Wr of the temperature measurement region RM is set to be the same as a line width of the discharged molding material. A center of the width of the temperature measurement region RM is set at a center of the nozzle hole 62 at the current position of the nozzle 61.

As described above, since the temperature acquisition unit 70 is implemented by a radiation thermometer, the temperature acquisition unit 70 measures one temperature in the temperature measurement region RM in the present embodiment. Accordingly, the control unit 500 acquires the one measured temperature as the temperature Tb of the existing layer Lb. For example, when the temperature acquisition unit 70 is implemented by an infrared camera, the temperature acquisition unit 70 measures a temperature distribution in the temperature measurement region RM. In this case, the control unit 500 acquires a lowest temperature in the temperature measurement region RM as the temperature Tb of the existing layer Lb using the temperature distribution measured by the temperature acquisition unit 70.

Next, in step S132, the control unit 500 controls a temperature Tu of the nozzle heater 67 according to the temperature Tb of the existing layer Lb acquired by the temperature acquisition unit 70. In the present embodiment, the control unit 500 controls the temperature Tu of the nozzle heater 67 such that a relationship of the temperature Tb of the existing layer Lb, a path cross-sectional area Sb of the existing layer Lb, a specific gravity ρb of a material used for molding the existing layer Lb, a specific heat Cb of the material used for molding the existing layer Lb, a temperature Tu of the nozzle heater 67, a path cross-sectional area Su of the subsequent layer Lu, a specific gravity ρu of a material used for molding the subsequent layer Lu, a specific heat Cu of the material used for molding the subsequent layer Lu, a thermal decomposition temperature Td that is a lower temperature between a thermal decomposition temperature Td1 of the material used for molding the existing layer Lb and a thermal decomposition temperature Td2 of the material used for molding the subsequent layer Lu, and a glass transition point Tg that is a higher glass transition point between a glass transition point Tg1 of the material used for molding the existing layer Lb and a glass transition point Tg2 of the material used for molding the subsequent layer Lu satisfies the following expression (1).

$$Td > (Tu \times Su \times \rho u \times Cu + Tb \times Sb \times \rho b \times Cb)/(Su \times \rho u \times Cu + Sb \times \rho b \times Cb) > Tg \quad (1)$$

The path cross-sectional area Sb of the existing layer Lb refers to a cross-sectional area of a molding material that is discharged from the nozzle 61 and is used for molding the existing layer Lb. The path cross-sectional area Su of the subsequent layer Lu refers to a cross-sectional area of a molding material that is discharged from the nozzle 61 and is used for molding the subsequent layer Lu. The path cross-sectional area Sb of the existing layer Lb can be calculated by dividing a volume of the molding material discharged from the nozzle 61 by a path length during molding of the existing layer Lb by using molding data used for molding the existing layer Lb. The path cross-sectional area Su of the subsequent layer Lu can be calculated by dividing a volume of the molding material discharged from the nozzle 61 by a path length during molding of the subsequent layer Lu by using molding data used for molding the subsequent layer Lu. Values represented by the material physical property data which is acquired by the control unit 500 in step S115 can be used as the specific gravity ρb, the specific heat Cb, the thermal decomposition temperature Td1, and the glass transition point Tg1 of the material used for molding the existing layer Lb. Values represented by the material physical property data acquired by the control unit 500 in step S115 can be used as the specific gravity ρu, the specific heat Cu, the thermal decomposition temperature Td2, and the glass transition point Tg2 of the material used for molding the subsequent layer Lu.

The molding material is discharged from the nozzle 61 to the temperature measurement region RM under the control of the control unit 500 in step S133. Since the temperature Tu of the nozzle heater 67 is controlled so as to satisfy the relationship of the above expression (1), a temperature of the discharged molding material can be the same as the temperature Tu of the nozzle heater 67. The molding material discharged from the nozzle 61 is in contact with the existing layer Lb and heat is transferred from the discharged molding material to the existing layer Lb, so that the temperature of the existing layer Lb is higher than the glass transition point Tg1 and lower than the thermal decomposition temperature Td1, and the temperature of the subsequent layer Lu is higher than the glass transition point Tg2 and lower than the thermal decomposition temperature Td2. Therefore, since the molding material of the existing layer Lb and the molding material of the subsequent layer Lu are prevented from thermal decomposition and the molding material of the existing layer Lb can be re-plasticized, adhesion between the existing layer Lb and the subsequent layer Lu can be improved.

According to the three-dimensional molding device 100 in the above-described present embodiment, the adhesion between the existing layer Lb and the subsequent layer Lu can be improved by using the nozzle heater 67 provided inside the molding unit 200. Compared with a case where the adhesion between the existing layer Lb and the subsequent layer Lu is improved by providing a device used for heating the existing layer Lb outside the molding unit 200, energy consumption can be reduced and the three-dimensional molding device 100 can be simplified.

Since the temperature acquisition unit 70 is implemented by a non-contact thermometer in the present embodiment, the temperature Tb of the existing layer Lb can be measured without damaging the existing layer Lb.

Although the ABS resin in a pellet form is used as the material in the present embodiment, as the material that is used in the molding unit 200, a material used for molding the three-dimensional molded object may be adopted with various materials such as a thermoplastic material, a metal material, and a ceramic material as main materials. Here, the "main material" refers to a material serving as a main component used for molding the shape of the three-dimensional molded object and refers to a material having content of 50% or more by weight in the three-dimensional molded object. The above-described molding material includes a material obtained by melting each main material alone or by melting the main material and a part of components into a paste form.

When the thermoplastic material is used as the main material, the plasticizing unit 30 plasticizes the material to generate a molding material. "Plasticize" refers to that the thermoplastic material is heated and melted. "Melt" refers to that the thermoplastic material is heated to a temperature equal to or higher than a glass transition point so as to be softened and exhibit fluidity.

An example of the thermoplastic material may include any one thermoplastic resin material or a combination of two or more thermoplastic resin materials in the following example.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyether ether ketone (PEEK)

Additives such as a pigment, a metal, a ceramic, a wax, a flame retardant, an antioxidant, and a heat stabilizer, and the like may be mixed into the thermoplastic material. The thermoplastic material is converted into a state of being plasticized and melted by the rotation of the flat screw 40 and the heating of the heater 58 in the plasticizing unit 30. The molding material generated in such a manner is hardened by a decrease in the temperature after being discharged from the nozzle hole 62.

It is desirable that the thermoplastic material is emitted from the nozzle hole 62 in a state of being heated at a temperature equal to or higher than the glass transition point of the thermoplastic material and being completely melted. The "state of being completely melted" refers to a state in which no unmelted thermoplastic material is present. For example, when a thermoplastic resin in a pellet form is used as the material, the "state of being completely melted" refers to a state in which no solid object in a pellet form remains.

The following metal material, for example, may be used as the main material in the molding unit 200 instead of the above-described thermoplastic material. In this case, it is desirable that the following metal material is formed into a powder material, a component melted at the time of generating the molding material is mixed with the powder material, and then the mixed material is added into the plasticizing unit 30.

Example of Metal Material

Magnesium (Mg), iron (Fe), cobalt (Co), chromium (Cr), aluminum (Al), titanium (Ti), copper (Cu), nickel (Ni), or an alloy containing one or more of these metals Example of Alloy Maraging steel, stainless steel, cobalt chromium molybdenum, titanium alloy, nickel alloy, aluminum alloy, cobalt alloy, cobalt chromium alloy A ceramic material may be used as the main material in the molding unit 200 instead of the above-described metal material. Examples of the ceramic material may include an oxide ceramic such as silicon dioxide, titanium dioxide, aluminum oxide, zirconium oxide, and a non-oxide ceramic such as aluminum nitride. When the above-described metal material or ceramic material is used as the main material, the molding material placed on the stage 300 may be hardened by, for example, irradiating with a laser and sintering with hot air or the like.

A powder material of the metal material or the ceramic material that is added into the material supply unit 20 may be a mixed material obtained by mixing a plurality of types of powders that include powders of a single metal or powders of an alloy and include powders of a ceramic material. The powder material of the metal material or the ceramic material may be coated with, for example, a thermoplastic resin as illustrated in the above-described example, or a thermoplastic resin other than the thermoplastic resin. In this case, the thermoplastic resin may be melted in the plasticizing unit 30 to exhibit fluidity.

The following solvents, for example, may be added to the powder material of the metal material or the ceramic material that is added into the material supply unit 20. One solvent or a combination of two or more solvents selected from the following solvents may be used.

Example of Solvent

Water, (poly) alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetate, sulfoxide-based solvents such as dimethyl sulfoxide and diethyl sulfoxide, pyridine-based solvents such as pyridine, γ-picoline, and 2,6-lutidine, tetraalkylammonium acetates such as tetrabutylammonium acetate, ionic liquids such as butyl carbitol acetate, and the like In addition, the following binder, for example, may be added to the powder material of the metal material or the ceramic material that is added into the material supply unit 20.

Example of Binder

Figure 8:
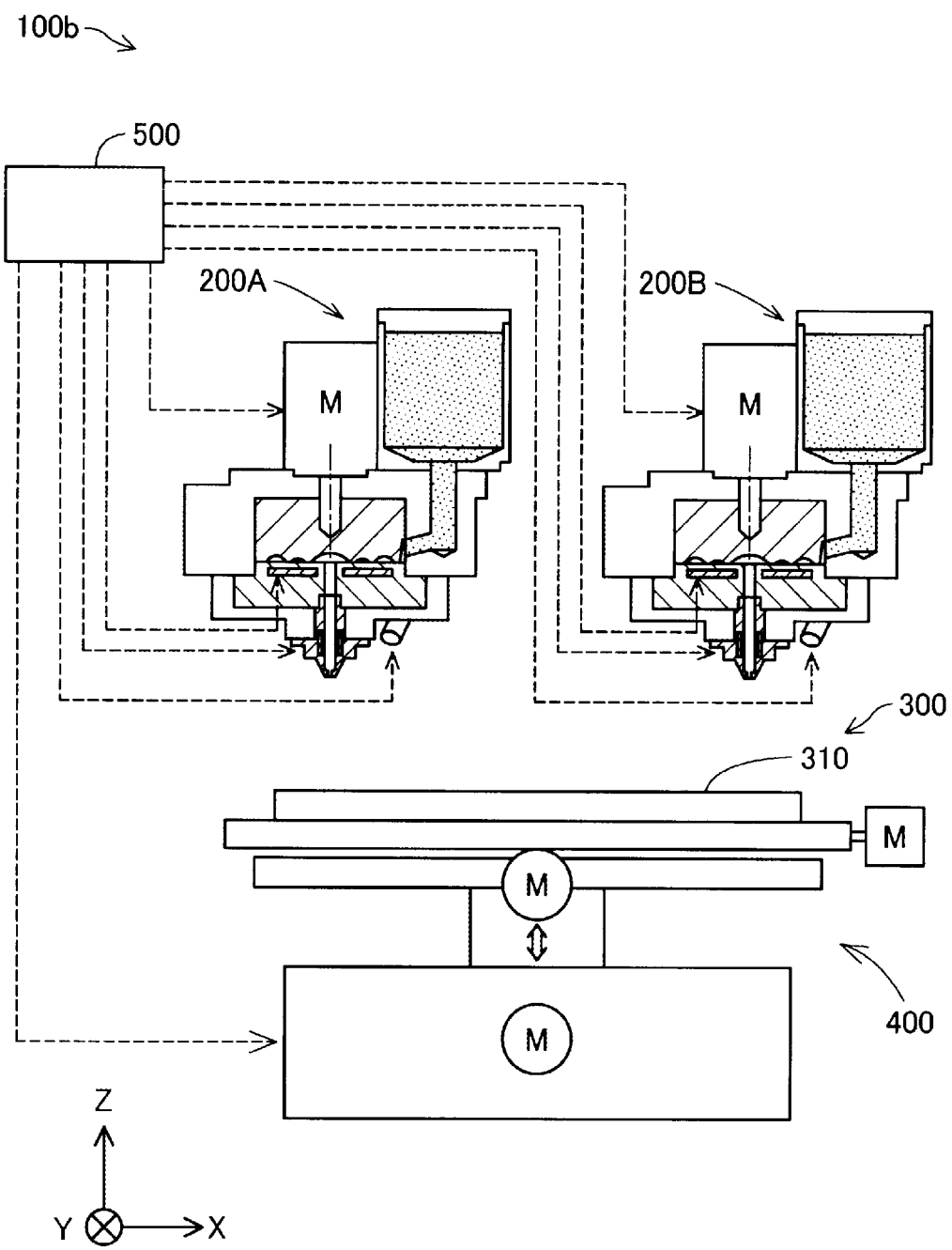
FIG. 8 is a diagram showing a schematic configuration of a three-dimensional molding device according to another embodiment.

An acrylic resin, an epoxy resin, a silicone resin, a cellulose-based resin, a synthetic resin, a polylactic acid (PLA), a polyamide (PA), a polyphenylene sulfide (PPS), a polyether ether ketone (PEEK), or other thermoplastic resins B. Other Embodiments B1. FIG. 8 is a diagram showing a schematic configuration of a three-dimensional molding device 100*b* according to another embodiment. The three-dimensional molding device 100*b* includes a first molding unit 200A and a second molding unit 200B. A configuration of the first molding unit 200A and the second molding unit 200B is the same as the configuration of the molding unit 200 described with reference to FIG. 1 according to the first embodiment. Thus, even if a material contained in the material supply unit 20 is not replaced, the three-dimensional molded object OB may be molded using two different materials. For example, the first molding unit 200A may use a first material to mold an odd layer of the three-dimensional molded object OB and the second molding unit 200B may use a second material that is different from the first material to mold an even layer of the three-dimensional molded object OB. That is, the three-dimensional molded object OB may be molded by alternately stacking the layer that is molded using the first material and the layer that is molded using the second material. In this case, in step S131 in FIG. 6, the control unit 500 acquires a temperature of a first layer of the three-dimensional molded object OB that is molded using the first material at the time of molding a second layer of the three-dimensional molded object OB using the second material. The control unit 500 acquires a temperature of the second layer of the three-dimensional molded object OB that is molded using the second material at the time of molding a third layer of the three-dimensional molded object OB that is molded using the first material.

B2. The temperature acquisition unit 70 is provided at a position adjacent to the nozzle 61 according to the above-described first embodiment. In contrast, the temperature acquisition unit 70 may be provided outside the molding unit 200. For example, the molding unit 200 and the stage 300 may be covered by a chamber including a sight window, and the temperature acquisition unit 70 may be provided outside the chamber and may measure the temperature Tb of the existing layer Lb via the sight window. Accordingly, a malfunction of the temperature acquisition unit 70 caused by being exposed to a high temperature may be prevented.

B3. The temperature acquisition unit 70 is implemented by a non-contact thermometer according to the above-described first embodiment. In contrast, the temperature acquisition unit 70 may be implemented by a contact thermometer. For example, the temperature acquisition unit 70 may be implemented by a probe including a thermocouple thermometer at a tip of the probe. In this case, the temperature Tb of the existing layer Lb can be acquired by scanning the existing layer Lb with the probe.

B4. The ABS resin that is an amorphous thermoplastic resin is used for molding the existing layer Lb and the subsequent layer Lu according to the above-described first embodiment. In contrast, one of the existing layer Lb and the subsequent layer Lu may be molded using a crystallographic thermoplastic resin and the other of the existing layer Lb and the subsequent layer Lu may be molded using an amorphous thermoplastic resin. Examples of the crystallographic thermoplastic resin may include a nylon resin, a nylon resin containing carbon fibers, a polypropylene resin (PP), and a polyether ether ketone (PEEK). Examples of the amorphous thermoplastic resin may include an ABS resin and a polycarbonate (PC). The control unit 500 may control the temperature Tu of the nozzle heater 67 so as to satisfy the following expression (2) using a temperature Tf that is a lower temperature between a melting point of the crystallographic thermoplastic resin and a thermal decomposition temperature of the amorphous thermoplastic resin.

$$Tf > (Tu \times Su \times \rho u \times Cu + Tb \times Sb \times \rho b \times Cb)/(Su \times \rho u \times Cu + Sb \times \rho b \times Cb) > Tg \quad (2)$$

In this case, even when the discharged molding material is in contact with the existing layer Lb, the temperature of the existing layer Lb and the temperature of the subsequent layer Lu do not exceed the melting point of the crystallographic thermoplastic resin and do not exceed the thermal decomposition temperature of the amorphous thermoplastic resin, so that shapes of the existing layer Lb and the subsequent layer Lu can be prevented from collapsing. The shapes of the existing layer Lb and the subsequent layer Lu can be reliably prevented from collapsing by using a temperature that is lower than the melting point of the crystallographic thermoplastic resin by 40 DEG C. instead of using the melting point of the crystallographic thermoplastic resin described above.

B5. The ABS resin that is an amorphous thermoplastic resin is used for molding the existing layer Lb and the subsequent layer Lu according to the above-described first embodiment. In contrast, the crystallographic thermoplastic resin may be used to mold both the existing layer Lb and the subsequent layer Lu. The control unit 500 may control the temperature Tu of the nozzle heater 67 so as to satisfy the following expression (3) using a temperature Tm that is a lower temperature between the melting point of the thermoplastic resin used for molding the existing layer Lb and the melting point of the thermoplastic resin used for molding the subsequent layer Lu.

$$Tm > (Tu \times Su \times \rho u \times Cu + Tb \times Sb \times \rho b \times Cb)/(Su \times \rho u \times Cu + Sb \times \rho b \times Cb) > Tg \quad (3)$$

In this case, even when the discharged molding material is in contact with the existing layer Lb, the temperature of the existing layer Lb does not exceed the melting point of the molding material used for molding the existing layer Lb, and the temperature of the subsequent layer Lu does not exceed the melting point of the molding material used for molding the subsequent layer Lu, so that the shapes of the existing layer Lb and the subsequent layer Lu can be prevented from collapsing.

B6. The ABS resin that is an amorphous thermoplastic resin is used for molding the existing layer Lb and the subsequent layer Lu according to the above-described first embodiment. In contrast, one of the existing layer Lb and the subsequent layer Lu may be molded using a crystallographic thermoplastic resin and the other of the existing layer Lb and the subsequent layer Lu may be molded by an amorphous thermoplastic resin. The control unit 500 may control the temperature Tu of the nozzle heater 67 so as to satisfy the following expression (4) using a temperature Tp which is a higher temperature between the melting point of the crystallographic thermoplastic resin and the glass transition point of the amorphous thermoplastic resin.

$$Td > (Tu \times Su \times \rho u \times Cu + Tb \times Sb \times \rho b \times Cb)/(Su \times \rho u \times Cu + Sb \times \rho b \times Cb) > Tp \quad (4)$$

In this case, the discharged molding material is in contact with the existing layer Lb, so that the temperature of the existing layer Lb and the temperature of the subsequent layer Lu may be higher than the melting point of the crystallographic thermoplastic resin and higher than the glass transition point of the amorphous thermoplastic resin. Accordingly, adhesion between the existing layer Lb and the subsequent layer Lu may be further improved.

B7. The ABS resin that is an amorphous thermoplastic resin is used for molding the existing layer Lb and the subsequent layer Lu according to the above-described first embodiment. In contrast, the crystallographic thermoplastic resin may be used to mold both the existing layer Lb and the subsequent layer Lu. The control unit 500 may control the temperature Tu of the nozzle heater 67 so as to satisfy the following expression (5) using a temperature Tq that is a higher temperature between the melting point of the thermoplastic resin used for molding the existing layer Lb and the melting point of the thermoplastic resin used for molding the subsequent layer Lu.

$$Td > (Tu \times Su \times \rho u \times Cu + Tb \times Sb \times \rho b \times Cb)/(Su \times \rho u \times Cu + Sb \times \rho b \times Cb) > Tq \quad (5)$$

In this case, the discharged molding material is in contact with the existing layer Lb, so that the temperature of the existing layer Lb may be higher than the melting point of the molding material used for molding the existing layer Lb and higher than the melting point of the molding material used for molding the subsequent layer Lu. Accordingly, adhesion between the existing layer Lb and the subsequent layer Lu may be further improved.

B8. The same material is used for molding the existing layer Lb and the subsequent layer Lu according to the above-described first embodiment. Therefore, the temperature Tu of the nozzle heater 67 may be controlled so as to satisfy the following expression (6) which is obtained by simplifying the above-described expression (1).

$$Td > (Tu \times Su + Tb \times Sb)/(Su + Sb) > Tg \quad (6)$$

In this case, the control unit 500 may control the temperature Tu of the nozzle heater 67 without using information relating to the specific gravity and the specific heat of the material. Therefore, the nozzle heater 67 can be controlled more easily.

B9. According to the above-described first embodiment, the specific gravity is set to 1.11 and the specific heat is set to 1.40 (kJ/kg·K) for the ABS resin that is a material used for molding the three-dimensional molded object OB in the material physical property data. In contrast, the specific gravity may be set to a value from 1.01 to 1.21 and the specific heat may be set to a value from 1.30 to 1.70 (kJ/kg·K) for the ABS resin that is a material used for molding the three-dimensional molded object OB in the material physical property data. When the material used for molding the three-dimensional molded object OB is a polycarbonate (PC), the polycarbonate (PC) in the material physical property data may be set to be an amorphous thermoplastic resin, a thermal decomposition temperature may be set to 420 DEG C., a glass transition point may be set to 161 DEG C., a specific gravity may be set to 1.20, and a specific heat may be set to a value from 1.17 to 1.26 (kJ/kg·K). When the material used for molding the three-dimensional molded object OB is a polypropylene resin (PP), the polypropylene resin (PP) may be set to be a crystallographic thermoplastic resin, a thermal decomposition temperature may be set to 300 DEG C., a melting point may be set to 165 DEG C., a glass transition point may be set to 0 DEG C., a specific gravity may be set to 0.90, and a specific heat may be set to a value from 1.79 to 1.92 (kJ/kg·K) in the material physical property data. When the material used for molding the three-dimensional molded object OB is a polyether ether ketone (PEEK), the polyether ether ketone (PEEK) in the material physical property data may be set to be a crystallographic thermoplastic resin, a thermal decomposition temperature may be set to 450 DEG C., a melting point may be set to 341 DEG C., a glass transition point may be set to 143 DEG C., a specific gravity may be set to 1.30, and a specific heat may be set to a value from 1.34 to 1.90 (kJ/kg·K).

C. Other Aspects

The present disclosure is not limited to the embodiments described above, and can be implemented in various forms without departing from the scope of the present disclosure. For example, the present disclosure can be implemented by the following forms. In order to solve some or all of the problems described in the present disclosure, or to achieve some or all effects of the present disclosure, technical features of the embodiments described above corresponding to technical features described below of the embodiments can be replaced or combined as appropriate. In addition, unless is described as essential herein, the technical features can be deleted as appropriate.

1. According to a first aspect of the present disclosure, a three-dimensional molding device is provided. The three-dimensional molding device includes a plasticizing unit that plasticizes a material containing a thermoplastic resin into a molding material, a discharge unit that discharges the molding material supplied from the plasticizing unit towards a stage, a moving mechanism that changes a relative position between the discharge unit and the stage, a heating unit that heats the discharge unit, a temperature acquisition unit that acquires a temperature of the molding material placed on the stage, and a control unit that controls the plasticizing unit and the moving mechanism to arrange the molding material in a layer along a predetermined path. The control unit controls the heating unit such that a relationship of a temperature Tb of an existing layer that is a layer of the molding material placed on the stage, a path cross-sectional area Sb of the existing layer, a specific gravity ρb of a first thermoplastic resin contained in a material used for molding the existing layer, a specific heat Cb of the first thermoplastic resin, temperature Tu of the heating unit, a path cross-sectional area Su of a subsequent layer that is a layer of the molding material placed on the existing layer, a specific gravity ρu of a second thermoplastic resin contained in a material used for molding the subsequent layer, a specific heat Cu of the second thermoplastic resin, a thermal decomposition temperature Td that is a lower temperature between a thermal decomposition temperature of the first thermoplastic resin and a thermal decomposition temperature of the second thermoplastic resin, and glass transition point Tg that is a higher glass transition point between a glass transition point of the first thermoplastic resin and a glass transition point of the second thermoplastic resin satisfies the following expression (1).

$$Td > (Tu \times Su \times \rho u \times Cu + Tb \times Sb \times \rho b \times Cb)/(Su \times \rho u \times Cu + Sb \times \rho b \times Cb) > Tg \quad (1)$$

According to the three-dimensional molding device of this aspect, the molding material heated by the heating unit is discharged onto the existing layer, thereby the existing layer can be plasticized. Accordingly, adhesion between the existing layer and the subsequent layer can be improved, and wasteful energy consumption can be prevented.

2. In the three-dimensional molding device according to the above-described aspect, one of the first thermoplastic resin and the second thermoplastic resin may be a crystallographic thermoplastic resin. The control unit may control the heating unit such that a relationship of the temperature Tb, the path cross-sectional area Sb, the specific gravity ρb, the specific heat Cb, the temperature Tu, the path cross-sectional area Su, the specific gravity ρu, the specific heat Cu, the glass transition point Tg, and a temperature Tf that is a lower temperature between a melting point of the one of the first thermoplastic resin and the second thermoplastic resin and a thermal decomposition temperature of the other of the first thermoplastic resin and the second thermoplastic resin satisfies the following expression (2).

$$Tf > (Tu \times Su \times \rho u \times Cu + Tb \times Sb \times \rho b \times Cb)/(Su \times \rho u \times Cu + Sb \times \rho b \times Cb) > Tg \quad (2)$$

According to the three-dimensional molding device of this aspect, even when the heated molding material is discharged onto the existing layer, the temperature of the existing layer and the temperature of the subsequent layer do not exceed the melting point of the crystallographic thermoplastic resin, so that shapes of the existing layer and the subsequent layer are prevented from collapsing and adhesion between the existing layer and the subsequent layer can be improved.

3. In the three-dimensional molding device according to the above-described aspect, both the first thermoplastic resin and the second thermoplastic resin may be a crystallographic thermoplastic resin. The control unit may control the heating unit such that a relationship of the temperature Tb, the path cross-sectional area Sb, the specific gravity ρb, the specific heat Cb, the temperature Tu, the path cross-sectional area Su, the specific gravity ρu, the specific heat Cu, the glass transition point Tg, and a melting point Tm that is a lower melting point between the melting point of the first thermoplastic resin and the melting point of the second thermoplastic resin satisfies the following expression (3).

$$Tm > (Tu \times Su \times \rho u \times Cu + Tb \times Sb \times \rho b \times Cb)/(Su \times \rho u \times Cu + Sb \times \rho b \times Cb) > Tg \quad (3)$$

According to the three-dimensional molding device of this aspect, even when the heated molding material is discharged onto the existing layer, the temperature of the existing layer and the temperature of the subsequent layer do not exceed the melting point of the crystallographic thermoplastic resin, so that shapes of the existing layer and the subsequent layer are prevented from collapsing and adhesion between the existing layer and the subsequent layer can be improved.

4. In the three-dimensional molding device according to the above-described aspect, one of the first thermoplastic resin and the second thermoplastic resin may be a crystallographic thermoplastic resin. The control unit may control the heating unit such that a relationship of the temperature Tb, the path cross-sectional area Sb, the specific gravity ρb, the specific heat Cb, the temperature Tu, the path cross-sectional area Su, the specific gravity ρu, the specific heat Cu, the thermal decomposition temperature Td, and a temperature Tp that is a higher temperature between the melting point of the one of the first thermoplastic resin and the second thermoplastic resin and the glass transition point of the other of the first thermoplastic resin and the second thermoplastic resin satisfies the following expression (4).

$$Td > (Tu \times Su \times \rho u \times Cu + Tb \times Sb \times \rho b \times Cb)/(Su \times \rho u \times Cu + Sb \times \rho b \times Cb) > Tp \quad (4)$$

According to the three-dimensional molding device of this aspect, the heated molding material is discharged onto the existing layer so that the temperature of the existing layer and the temperature of the subsequent layer are higher than the melting point of the crystallographic thermoplastic resin. Accordingly, adhesion between the existing layer and the subsequent layer can be improved.

5. In the three-dimensional molding device according to the above-described aspect, both the first thermoplastic resin and the second thermoplastic resin may be a crystallographic thermoplastic resin. The control unit may control the heating unit such that a relationship of the temperature Tb, the path cross-sectional area Sb, the specific gravity ρb, the specific heat Cb, the temperature Tu, the path cross-sectional area Su, the specific gravity ρu, the specific heat Cu, the thermal decomposition temperature Td, and a melting point Tq that is a higher melting point between the melting point of the first thermoplastic resin and the melting point of the second thermoplastic resin satisfies the following expression (5).

$$Td > (Tu \times Su \times \rho u \times Cu + Tb \times Sb \times \rho b \times Cb)/(Su \times \rho u \times Cu + Sb \times \rho b \times Cb) > Tq \quad (5)$$

According to the three-dimensional molding device of this aspect, the heated molding material is discharged onto the existing layer so that the temperature of the existing layer and the temperature of the subsequent layer are higher than the melting point of the crystallographic thermoplastic resin. Accordingly, adhesion between the existing layer and the subsequent layer can be improved.

6. In the three-dimensional molding device according to the above-described aspect, a type of the first thermoplastic resin and a type of the second thermoplastic resin may be the same. The control unit may control the heating unit such that a relationship of the temperature Tb, the path cross-sectional area Sb, the temperature Tu, the path cross-sectional area Su, the thermal decomposition temperature Td, and the glass transition point Tg satisfies the following expression (6).

$$Td > (Tu \times Su + Tb \times Sb)/(Su + Sb) > Tg \quad (6)$$

According to the three-dimensional molding device of this aspect, the heating unit can be controlled more easily.

7. The three-dimensional molding device according to the above-described aspect may include a plurality of molding units that include the plasticizing unit, the discharge unit, and the heating unit.

According to the three-dimensional molding device of this aspect, the molding material used for molding the existing layer and the molding material used for molding the subsequent layer can be easily made different.

8. In the three-dimensional molding device according to the above-described aspect, the temperature acquisition unit may be implemented by a non-contact thermometer.

According to the three-dimensional molding device of this aspect, the temperature Tb of the existing layer can be acquired without damaging the existing layer.

9. In the three-dimensional molding device according to the above-described aspect, the temperature Tb of the existing layer may be a temperature of a predetermined region on the path.

According to the three-dimensional molding device of this aspect, adhesion between the existing layer and the subsequent layer can be improved in a more reliable manner.

The present disclosure may be implemented in various forms other than the three-dimensional molding device. For example, the present disclosure may be implemented in forms such as a method for controlling a three-dimensional molding device and a method for molding a three-dimensional molded object.

What is claimed is:

1. A three-dimensional molding device comprising:
   a stage;
   a plasticizing unit that plasticizes a material containing a first thermoplastic resin or a second thermoplastic resin into a molding material;
   a nozzle that discharges the molding material towards the stage;
   a moving mechanism that changes a relative position between the nozzle and the stage;
   a nozzle heater that heats the molding material;
   a thermometer that acquires a temperature of the discharged molding material on the stage; and
   a control unit that controls the plasticizing unit and the moving mechanism to arrange the molding material in a plurality of layers along a predetermined path on the stage, wherein
   the control unit controls the nozzle heater to provide a relationship of a temperature Tb of an existing layer that is a layer of the molding material placed on the stage, a path cross-sectional area Sb of the existing layer, a specific gravity ρb of the first thermoplastic resin contained in a material used for molding the existing layer, a specific heat Cb of the first thermoplastic resin, a temperature Tu of the nozzle heater, a path cross-sectional area Su of a subsequent layer that is a layer of the molding material placed on the existing layer, a specific gravity ρu of the second thermoplastic resin contained in a material used for molding the subsequent layer, a specific heat Cu of the second thermoplastic resin, a thermal decomposition temperature Td that is a lower temperature from among a thermal decomposition temperature of the first thermoplastic resin and a thermal decomposition temperature of the second thermoplastic resin, and a glass transition point Tg that is a higher glass transition point from among a glass transition point of the first thermoplastic resin and a glass transition point of the second thermoplastic resin according to the following expression (1):

$$Td > (Tu \times Su \times \rho u \times Cu + Tb \times Sb \times \rho b \times Cb)/(Su \times \rho u \times Cu + Sb \times \rho b \times Cb) > Tg.$$

2. The three-dimensional molding device according to claim 1, wherein
one of the first thermoplastic resin and the second thermoplastic resin is a crystallographic thermoplastic resin, and
the control unit controls the nozzle heater to provide a relationship of the temperature Tb, the path cross-sectional area Sb, the specific gravity ρb, the specific heat Cb, the temperature Tu, the path cross-sectional area Su, the specific gravity ρu, the specific heat Cu, the glass transition point Tg, and a temperature Tf that is a lower temperature from among a melting point of the one of the first thermoplastic resin and the second thermoplastic resin and a thermal decomposition temperature of the other of the first thermoplastic resin and the second thermoplastic resin according to the following expression (2):

$$Tf > (Tu \times Su \times \rho u \times Cu + Tb \times Sb \times \rho b \times Cb)/(Su \times \rho u \times Cu + Sb \times \rho b \times Cb) > Tg.$$

3. The three-dimensional molding device according to claim 1, wherein
both the first thermoplastic resin and the second thermoplastic resin are a crystallographic thermoplastic resin, and
the control unit controls the nozzle heater to provide a relationship of the temperature Tb, the path cross-sectional area Sb, the specific gravity ρb, the specific heat Cb, the temperature Tu, the path cross-sectional area Su, the specific gravity ρu, the specific heat Cu, the glass transition point Tg, and a melting point Tm that is a lower melting point a melting point of the first thermoplastic resin and a melting point of the second thermoplastic resin according to the following expression (3):

$$Tm > (Tu \times Su \times \rho u \times Cu + Tb \times Sb \times \rho b \times Cb)/(Su \times \rho u \times Cu + Sb \times \rho b \times Cb) > Tg.$$

4. The three-dimensional molding device according to claim 1, wherein
one of the first thermoplastic resin and the second thermoplastic resin is a crystallographic thermoplastic resin, and
the control unit controls the nozzle heater to provide a relationship of the temperature Tb, the path cross-sectional area Sb, the specific gravity ρb, the specific heat Cb, the temperature Tu, the path cross-sectional area Su, the specific gravity ρu, the specific heat Cu, the thermal decomposition temperature Td, and a temperature Tp that is a lower temperature from among a melting point of the one of the first thermoplastic resin and the second thermoplastic resin and a glass transition point of the other of the first thermoplastic resin and the second thermoplastic resin according to the following expression (4):

$$Td > (Tu \times Su \times \rho u \times Cu + Tb \times Sb \times \rho b \times Cb)/(Su \times \rho u \times Cu + Sb \times \rho b \times Cb) > Tp.$$

5. The three-dimensional molding device according to claim 1, wherein
both the first thermoplastic resin and the second thermoplastic resin are a crystallographic thermoplastic resin, and
the control unit controls the nozzle heater to provide a relationship of the temperature Tb, the path cross-sectional area Sb, the specific gravity ρb, the specific heat Cb, the temperature Tu, the path cross-sectional area Su, the specific gravity ρu, the specific heat Cu, the thermal decomposition temperature Td, and a melting point Tq that is a higher melting point from among a melting point of the first thermoplastic resin and a melting point of the second thermoplastic resin according to the following expression (5):

$$Td > (Tu \times Su \times \rho u \times Cu + Tb \times Sb \times \rho b \times Cb)/(Su \times \rho u \times Cu + Sb \times \rho b \times Cb) > Tq.$$

6. The three-dimensional molding device according to claim 1, wherein
a type of the first thermoplastic resin and a type of the second thermoplastic resin are the same, and
the control unit controls the nozzle heater to provide a relationship of the temperature Tb, the path cross-sectional area Sb, the temperature Tu, the path cross-sectional area Su, the thermal decomposition temperature Td, and the glass transition point Tg according to the following expression (6):

$$Td > (Tu \times Su \times Tb \times Sb)/(Su \times Sb) > Tg.$$

7. The three-dimensional molding device according to claim 1, further comprising:
a plurality of molding units that include the plasticizing unit, the nozzle, and the nozzle heater.

8. The three-dimensional molding device according to claim 1, wherein
the thermometer includes a non-contact thermometer.

9. The three-dimensional molding device according to claim 1, wherein
the temperature Tb of the existing layer is a temperature of a predetermined region on the path.

10. A method for molding a three-dimensional molded object, the method comprising:
plasticizing a material that contains a first thermoplastic resin or a second thermoplastic resin into a molding material;
discharging the molding material from a nozzle towards a stage;
changing a relative position between the nozzle and the stage;
heating the nozzle so as to heat the molding material;
acquiring a temperature of the discharged molding material on the stage; and
controlling the plasticizing unit to arrange the molding material in a plurality of layers along a predetermined path on the stage,
wherein
in the heating step,
a temperature Tb of an existing layer that is a layer of the molding material placed on the stage is acquired, and
the nozzle heating is controlled to provide a relationship of the temperature Tb, a path cross-sectional area Sb of the existing layer, a specific gravity ρb of the first thermoplastic resin contained in a material used for molding the existing layer, a specific heat Cb of the first thermoplastic resin, a temperature Tu of the molding material that is discharged from the nozzle, a path cross-sectional area Su of a subsequent layer that is a layer of the molding material placed on the existing layer, a specific gravity ρu of the second thermoplastic resin contained in a material used for molding the subsequent layer, a specific heat Cu of the second thermoplastic resin, a thermal decomposition temperature Td that is a lower temperature from among a thermal decomposition temperature of the first thermoplastic resin and a thermal decomposition temperature of the second thermoplastic resin, and a glass transition point Tg that is a higher glass transition point from among a glass transition point of the first thermoplastic resin and a glass transition point of the second thermoplastic resin according to the following expression (7):

$$Td > (Tu \times Su \times \rho u \times Cu + Tb \times Sb \times \rho b \times Cb)/(Su \times \rho u \times Cu + Sb \times \rho b \times Cb) > Tg.$$

* * * * *